United States Patent
Ismail et al.

(10) Patent No.: US 7,526,590 B2
(45) Date of Patent: Apr. 28, 2009

(54) SYSTEMS AND METHODS FOR REMOTE PIPE RESOURCE MANAGEMENT IN WIRELESS ADAPTERS

(75) Inventors: Abdul R. Ismail, Beaverton, OR (US); Praveen Sampat, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 11/396,134

(22) Filed: Mar. 31, 2006

(65) Prior Publication Data

US 2007/0233922 A1   Oct. 4, 2007

(51) Int. Cl.
G06F 13/00   (2006.01)
H04H 20/71  (2008.01)

(52) U.S. Cl. .................. 710/112; 711/154; 455/3.03

(58) Field of Classification Search ............... 710/39, 710/52, 305, 310, 112, 56; 711/151, 154, 711/170–173; 370/310, 463; 709/250, 218, 709/225; 455/3.01, 3.03, 403; 725/81–82
See application file for complete search history.

(56) References Cited

U.S. PATENT DOCUMENTS

| | | | | |
|---|---|---|---|---|
| 5,014,221 A | * | 5/1991 | Mogul | 358/1.14 |
| 5,224,214 A | * | 6/1993 | Rosich | 710/39 |
| 5,917,502 A | * | 6/1999 | Kirkland et al. | 345/505 |
| 5,991,824 A | * | 11/1999 | Strand et al. | 710/1 |
| 6,070,208 A | * | 5/2000 | Brief | 710/104 |
| 6,145,045 A | * | 11/2000 | Falik et al. | 710/310 |
| 6,389,560 B1 | * | 5/2002 | Chew | 714/43 |
| 6,523,081 B1 | * | 2/2003 | Karlsson et al. | 710/305 |
| 6,735,677 B1 | * | 5/2004 | Stewart | 711/158 |
| 2002/0099919 A1 | * | 7/2002 | Normant et al. | 711/170 |
| 2002/0143921 A1 | * | 10/2002 | Stephan | 709/223 |
| 2007/0086425 A1 | * | 4/2007 | Leow et al. | 370/350 |
| 2007/0147236 A1 | * | 6/2007 | Lee | 370/229 |
| 2007/0173077 A1 | * | 7/2007 | Wang | 439/1 |

FOREIGN PATENT DOCUMENTS

JP   01152561 A   *   6/1989

OTHER PUBLICATIONS

2002 Symposium on VLSI Circuits. Digest of Technical Papers (Cat. No. o2CH37302) Publication Date: Jun. 13-15, 2002.*
USB specification 2.0.*

* cited by examiner

*Primary Examiner*—Paul R Myers
(74) *Attorney, Agent, or Firm*—Schubert Osterrieder & Nickelson PLLC (57) ABSTRACT

Embodiments include systems and methods for management of RPIPES in a Wireless Universal Serial Bus (WUSB) environment comprising at least one WUSB device. RPIPE management computer code is executed to perform RPIPE management functions including monitoring RPIPE memory usage, and storing transfer requests in a queue in memory of the host machine while awaiting availability of Host Wire Adapter (HWA) memory.

18 Claims, 5 Drawing Sheets

SYSTEMS AND METHODS FOR REMOTE PIPE RESOURCE MANAGEMENT IN WIRELESS ADAPTERS

FIELD

The present invention is in the field of wireless communications between a host computing system and multiple endpoint devices. More particularly, the invention is in the field of management of remote pipe resources in a wireless adapter.

BACKGROUND

"Wireless computing" is a term that has come to describe wireless communications between computing devices or between a computer and peripheral devices such as printers. For example, many computers, including tower and laptop models, have a wireless communications card that comprises a transmitter and receiver connected to an antenna. Or alternatively, a Host Wire Adapter (HWA) is connected to the computer by a USB cable. The HWA has an RF transmitter and receiver capable of communicating data in a USB-cognizable format. This enables the computer to communicate by Radio Frequency (RF) transmission with a wireless network of computers and peripheral devices. The flexibility and mobility that wireless computing affords is a major reason for its commercial success.

Thus, a Host Wire Adapter (HWA) provides the capabilities of a wireless USB host controller through a USB device interface. An HWA provides the host the ability to communicate with a large number of wireless USB devices. To communicate with a wireless USB device, an HWA implements a logical abstraction called remote pipes (RPIPES) that allows for data flow through the HWA to a specific endpoint of a wireless USB device. One RPIPE is required for communication to each endpoint. Each RPIPE requires memory in the HWA to support data transfers. This implies that the number of devices with which HWA can simultaneously communicate is directly proportional to the amount of memory in the HWA.

Since an HWA will typically be a low cost embedded device, there are practical limitations on the amount of data memory in the HWA. This implies that the host software will need to manage the transfers so that the HWA memory is not oversubscribed. It does this by configuring RPIPES in the HWA so that the number of memory blocks used by all the active RPIPES does not exceed the total number of available memory blocks. The host software achieves this by either retargeting an existing RPIPE to another endpoint, or setting an existing RPIPE to idle and configuring another RPIPE for this transfer. This retargeting and reconfiguring of RPIPES adds significant overhead (approximately 10-20%) to each transfer.

BRIEF DESCRIPTION OF THE DRAWINGS

Advantages of the invention will become apparent upon reading the following detailed description and upon reference to the accompanying drawings in which like references may indicate similar elements.

DETAILED DESCRIPTION OF EMBODIMENTS

The following is a detailed description of embodiments of the invention depicted in the accompanying drawings. The embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Embodiments include systems and methods for management of RPIPES in a Wireless Universal Serial Bus (WUSB) environment comprising at least one WUSB device. All references to WUSB may refer to "Certified Wireless USB from the USB-IF". RPIPE management computer code is executed to perform RPIPE management functions including monitoring RPIPE memory usage, and storing transfer requests in a queue in memory of the host machine while awaiting availability of Host Wire Adapter (HWA) memory.

Figure 1:
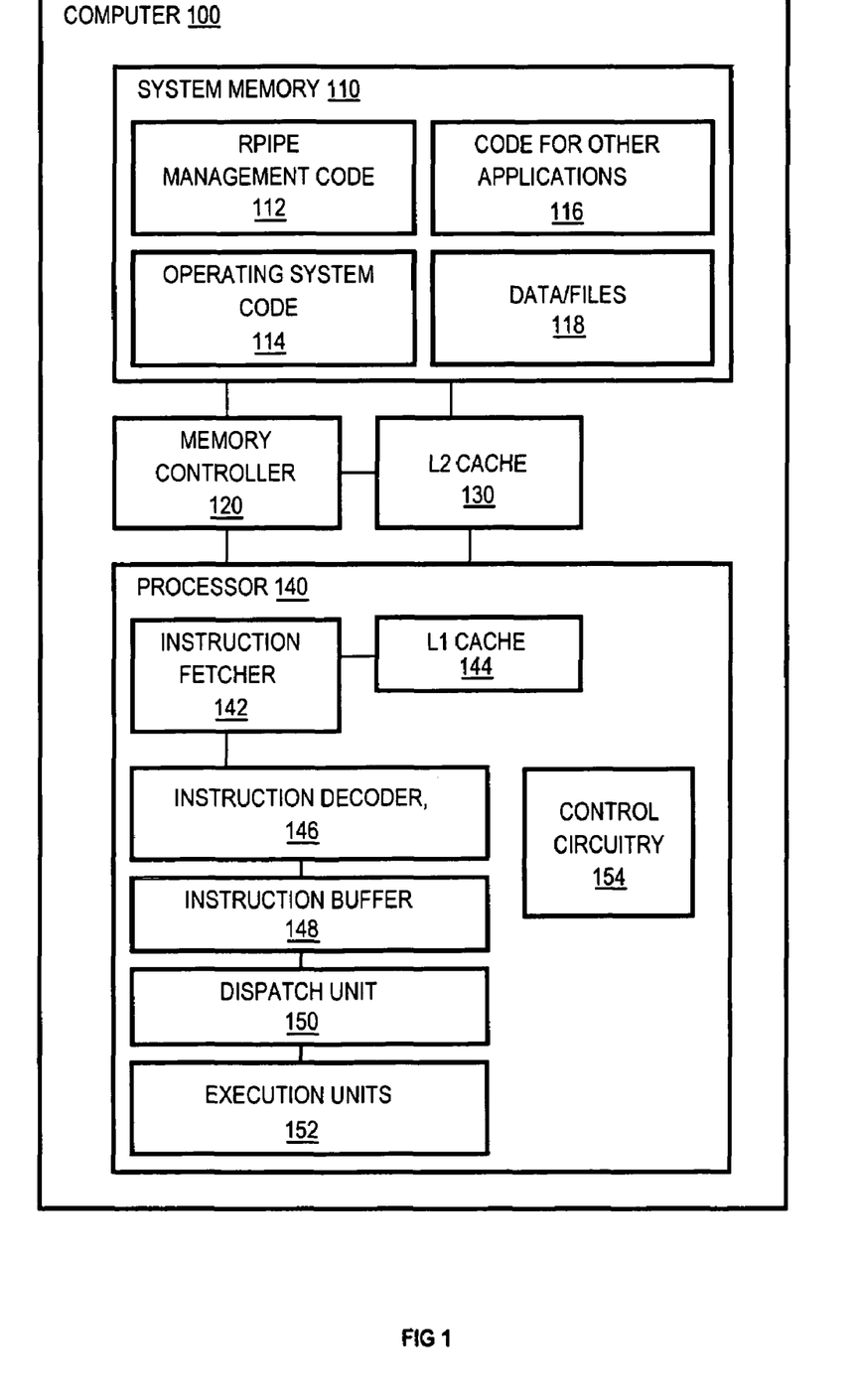
FIG. 1 depicts an embodiment of a computer to execute RPIPE management code.
Figure 1A:
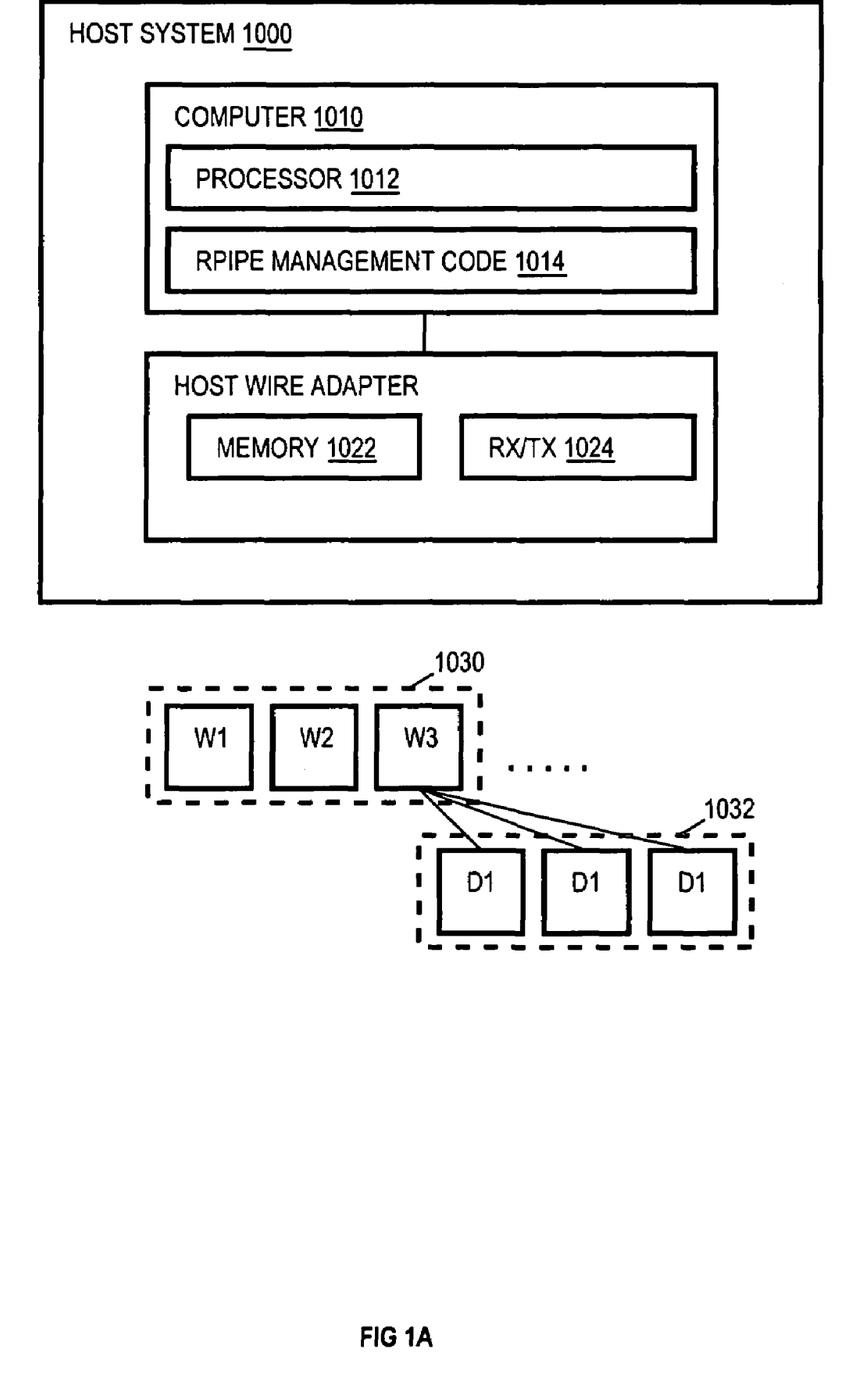
FIG. 1A depicts an embodiment of a host system with a host wire adapter.

FIG. 1A shows a host system 1000 to communicate with a plurality of Wireless USB (WUSB) devices 1030. Host system 1000 comprises a computer 1010 and a Host Wire Adapter (HWA) 1020. Computer 1010 comprises a processor 1012 and RPIPE management software 1014. RPIPE management software is executable code stored in a memory of computer 1010. When executed by processor 1012, the executable code causes the processor to perform a plurality of RPIPE management functions. These functions include configuring an RPIPE for each endpoint of connected WUSB devices. The functions further include sending a transfer request to HWA 1020 when there is enough memory 1022 in HWA 1020. The functions include placing a transfer request in a queue in the host computer memory when there is not enough memory in HWA 1020. The functions further include monitoring completion of pending transfers and sending a transfer request from the queue to HWA 1020 when a pending transfer is completed.

Memory 1022 of HWA 1020 stores RPIPE descriptors and data. Each RPIPE descriptor comprises an address and endpoint number of an endpoint of a device. Associated with each RPIPE is memory for data to be transferred to or from the device endpoint that is designated by the RPIPE descriptor. Thus, associated with each RPIPE are blocks of memory in HWA 1020 to store data. Since memory is sometimes limited in a low cost embedded HWA, there can be only so many RPIPES supported by the HWA. Ideally, there should be about twice as many RPIPES as supported WUSB devices. But there could be more or less than this. However, there will often be more transfer requests from the host than there are RPIPES in the HWA. Consequently, the host processor executes RPIPE management code to manage a queue of transfer requests. The host processor, operating under the directions of RPIPE management code, will place transfer requests in a queue when there is not enough memory in the HWA available to handle the request immediately. The host processor will await completion of a pending transfer before sending a new request to the HWA.

Figure 2:
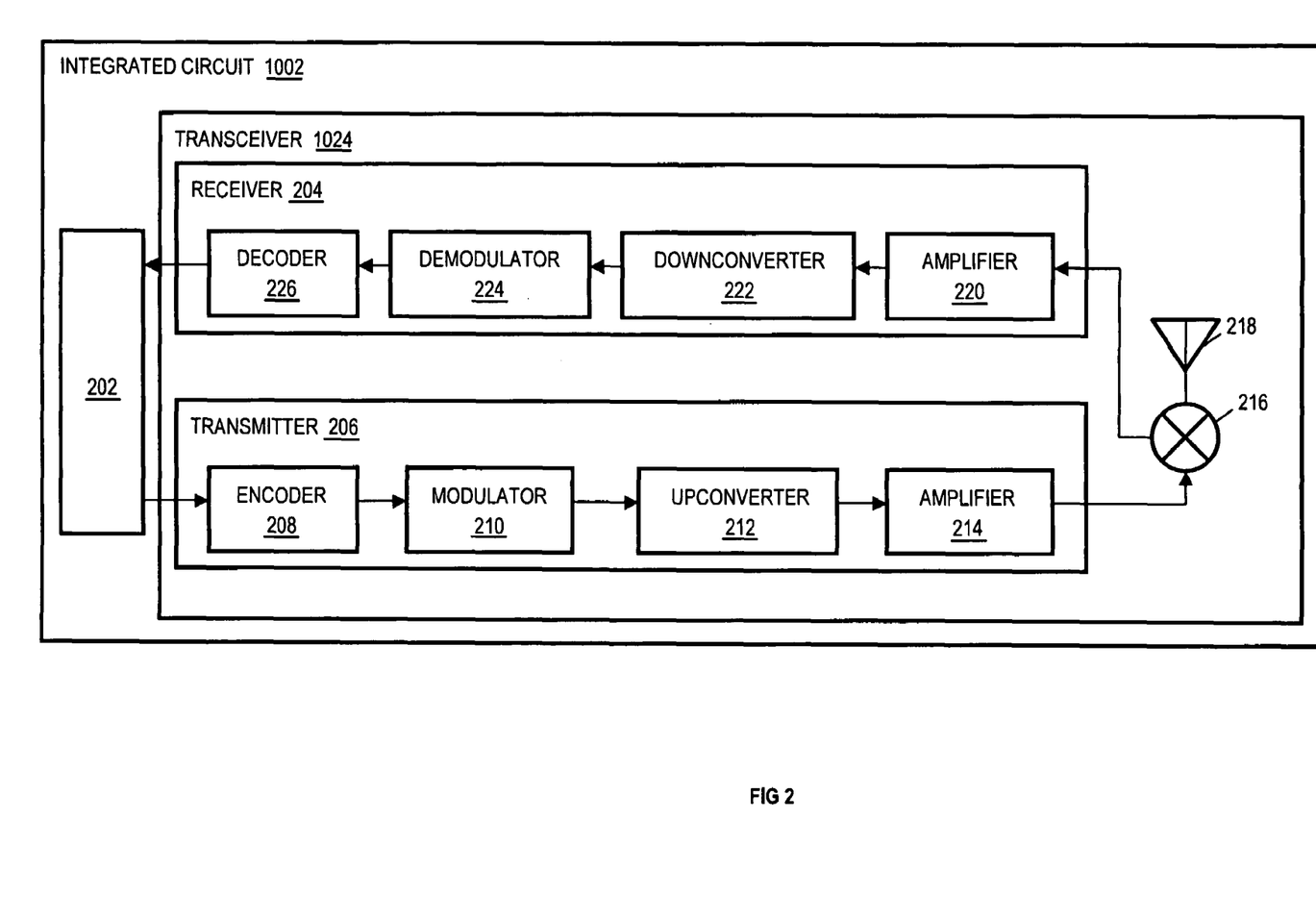
FIG. 2 depicts a transceiver in a Host Wire Adapter or WUSB.
Figure 2A:
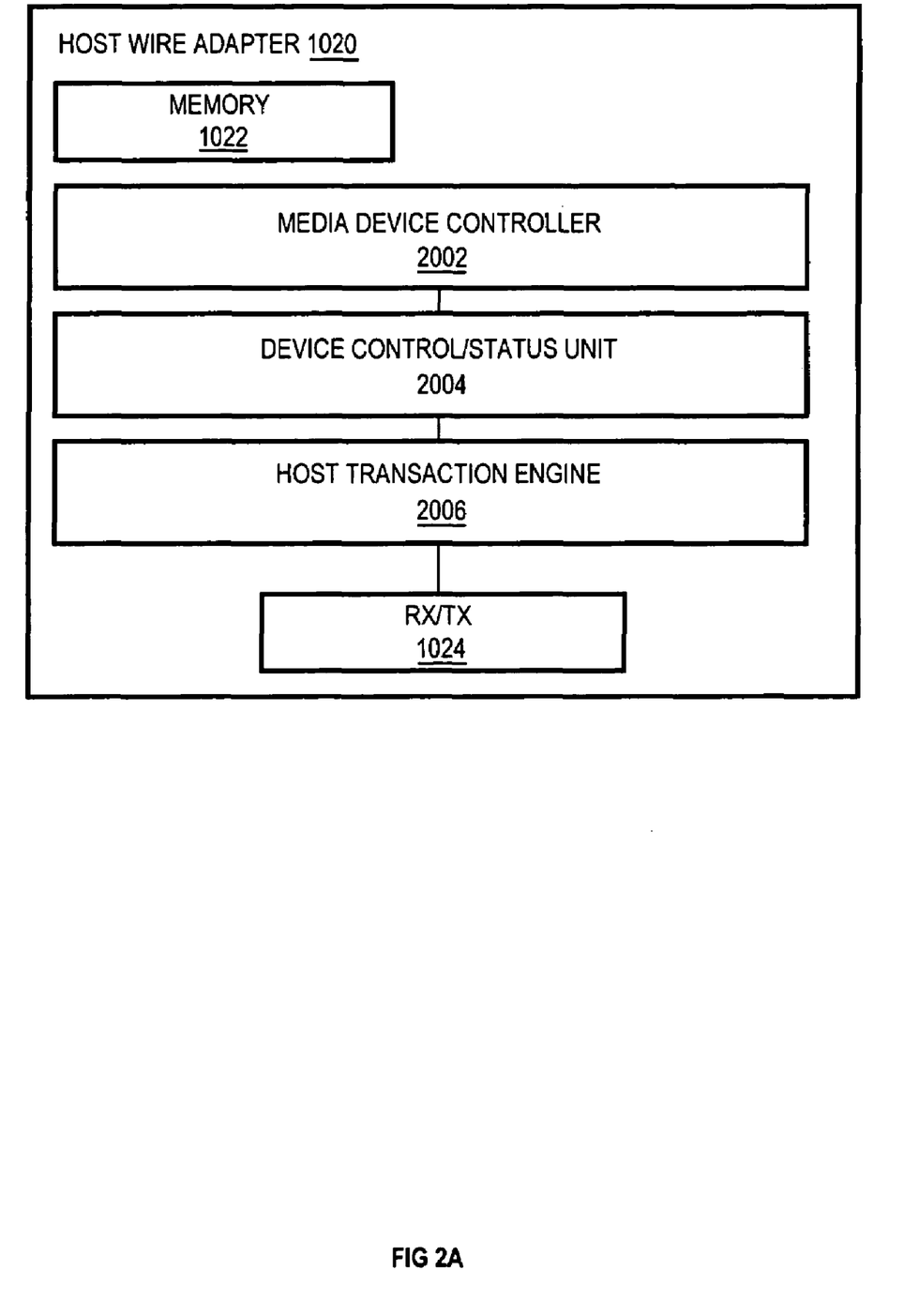
FIG. 2A depicts an embodiment of a Host Wire Adapter responsive to a host computer executing RPIPE management software.

HWA 1020 also comprises a transceiver (RX/TX) 1024. Transceiver 1024 receives signals from wireless USB devices 1030 and transmits signals to wireless USB devices 1030. Each Wireless USB device 1030 comprises a transceiver that is architecturally and functionally similar to the transceiver of the HWA. Therefore, the transmitter of the HWA may selectively communicate with a receiver of a WUSB, and the transmitter of a WUSB can communicate with the receiver of the HWA. In a typical configuration, one or more of devices 1030 may be a Device Wire Adapter (DWA) connected by USB cables to a plurality of wire devices D1, 1032. A DWA receives signals from, and transmits signals to, HWA 1020, wirelessly. Thus, a DWA has a transmitter/receiver as does the HWA. More detailed views of HWA 1020 and transceiver 1024 are shown in FIGS. 2A and 2.

Thus, a mouse or digital camera or other device may be connected by USB cable to a Device Wire Adapter (DWA) which communicates wirelessly with the HWA. Each connected USB device may have multiple endpoints. For example, a mouse comprises two or more endpoints, at least two separate endpoints corresponding to the two different buttons of a dual button mouse. A mouse may further comprise an endpoint corresponding to a wheel of the mouse. When a wirelessly connected mouse button is "clicked" by depressing and then releasing the mouse button quickly, data from the mouse is sent to the host computer by way of the wireless connection between the DWA and the HWA. This data is interpreted by the host processor to perform functions corresponding to what is selected by an arrow pointing to an item displayed on a video monitor at the time the mouse button is clicked. As another example, the processor may initiate a transfer of data from a digital camera. In an embodiment a window appears allowing a user of the host computer to select data of the digital camera to be transferred (uploaded) from the digital camera to the host computer. The data for these exemplary transfers, and other transfers between the host and WUSB devices, are transmitted and received wirelessly.

In operation, host processor 1012 processes transfer requests for transmission of data (information). A transfer request may be, for example, a request for data to be transmitted from a digital camera to host computer 1010. When processor 1012 processes a transfer request, the processor determines if enough memory is available in the HWA. Stated differently, the host determines if an RPIPE, and consequently, its associated memory, is available for the transfer. If so, the transfer request is sent to the HWA. More specifically, host processor 1012 sends to HWA 1020 an address of an RPIPE in the HWA and also sends the data to be transmitted to blocks of memory in the HWA, which blocks of memory are associated with the addressed RPIPE. HWA 1020 processes the transfer requests and communicates data wirelessly with WUSB devices according to the parameters of the RPIPE descriptors.

FIG. 1 shows a more detailed view of a computer 100 of a host system to communicate with wireless devices. Computer 100 comprises a system memory 110, a memory controller 120, an L2 cache 130, and a processor 140. System memory 110 comprises a hard disk drive memory, Read-Only Memory (ROM), and Random Access Memory (RAM). System memory 110 stores RPIPE management code 112, Operating System (OS) code 114, Basic Input-Output System (BIOS) code (not shown), and code for other application programs 116. System memory 110 also stores data and files 118. The RPIPE management code 112, OS code 114, and applications code 116, are typically stored on a hard drive, whereas BIOS code is typically stored in ROM.

Memory controller 120 effectuates transfers of instructions and data from system memory 110 to L2 cache 130 and from L2 cache 130 to an L1 cache 144 of processor 140. Thus, data and instructions are transferred from a hard drive to L2 cache near the time when they will be needed for execution in processor 140. L2 cache 130 is fast memory located physically close to processor 140. Instructions may include load and store instructions, branch instructions, arithmetic logic instructions, floating point instructions, etc. L1 cache 144 is located in processor 140 and contains data and instructions received from L2 cache 130. Ideally, as the time approaches for a program instruction to be executed, the instruction is passed with its data, if any, first to the L2 cache, and then as execution time is near imminent, to the L1 cache.

In addition to on-chip level 1 cache 144, processor 140 also comprises an instruction fetcher 142, instruction decoder 146, instruction buffer 148, a dispatch unit 150, execution units 152 and control circuitry 154. Instruction fetcher 142 fetches instructions from memory. Instruction fetcher 142 maintains a program counter and fetches instructions from L1 cache 130. The program counter of instruction fetcher 142 comprises an address of a next instruction to be executed. Instruction fetcher 142 also performs pre-fetch operations. Thus, instruction fetcher 142 communicates with a memory controller 214 to initiate a transfer of instructions from the system memory 110, to instruction cache L2 130, and to L1 instruction cache 144. The place in the cache to where an instruction is transferred from system memory 110 is determined by an index obtained from the system memory address.

Instruction fetcher 142 retrieves instructions passed to instruction cache 144 and passes them to an instruction decoder 146. Instruction decoder 146 receives and decodes the instructions fetched by instruction fetcher 142. An instruction buffer 148 receives the decoded instructions from instruction decoder 146. Instruction buffer 148 comprises memory locations for a plurality of instructions. Instruction buffer 148 may reorder the order of execution of instructions received from instruction decoder 146. Instruction buffer 148 therefore comprises an instruction queue to provide an order in which instructions are sent to a dispatch unit 150.

Dispatch unit 150 dispatches instructions received from instruction buffer 148 to execution units 152. In a superscalar architecture, execution units 152 may comprise load/store units, integer Arithmetic/Logic Units, floating point Arithmetic/Logic Units, and Graphical Logic Units, all operating in parallel. Dispatch unit 150 therefore dispatches instructions to some or all of the executions units to execute the instructions simultaneously. Execution units 152 comprise stages to perform steps in the execution of instructions received from dispatch unit 150. Data processed by execution units 152 are storable in and accessible from integer register files and floating point register files not shown. Thus, instructions are executed sequentially and in parallel.

FIG. 1 also shows control circuitry 154 to perform a variety of functions that control the operation of processor 100. For example, an operation controller within control circuitry 154 interprets the OPCode contained in an instruction and directs the appropriate execution unit to perform the indicated operation. Also, control circuitry 154 may comprise a branch redirect unit to redirect instruction fetcher 142 when a branch is determined to have been mispredicted. Control circuitry 154 may further comprise a flush controller to flush instructions younger than a mispredicted branch instruction. Computer 100 further comprises other components and systems not shown in FIG. 1, including, RAM, peripheral drivers, a system monitor, a keyboard, flexible diskette drives, removable non-volatile media drives, CD and DVD drives, a pointing device such as a mouse, etc. Computer 100 may be a personal computer, a workstation, a server, a mainframe computer, a notebook or laptop computer, etc.

In operation, processor 140 executes RPIPE management code 112. The encoded instructions of the code, when executed by the processor cause the processor to perform RPIPE management functions. During system initialization, HWA 1020 tells the host how much memory it has for data transfers through the HWA. HWA 1020 also tells the host software how many RPIPES it supports. The number of supported RPIPES should be large enough so that RPIPES do not have to be constantly reconfigured and retargeted to different endpoints. The host software configures an RPIPE for each endpoint of connected WUSB devices 1030, 1032. The host software is then able to track the usage of this memory based on the number of pending transfers to different endpoints.

For each new transfer to an endpoint, host processor 140 determines if there is enough memory in HWA 1020 to support this transfer. If the HWA does have the memory to support the transfer, the transfer request is sent to the HWA. If there is not enough memory currently available in the HWA to support the transfer, it is placed in a queue on the host. Host processor 140, operating under the directions of RPIPE management code 112, then monitors the completion of previously submitted transfers to determine when enough memory has been freed in HWA 1020 to allow queued transfers to be sent. When there is enough memory in the HWA to support this transfer, the transfer is sent to the RPIPE that is configured for this endpoint. The host software performs all the logic required to determine when it is safe to send a transfer to the HWA. This saves the overhead of making repeated USB control transfers to the HWA to reconfigure the RPIPES using get and set RPIPE commands.

Thus, host RPIPE management code 112 directs processor 140 to process transfer requests. In the course of operation, for example, the processor may receive a transfer request to transfer data to (or from) a WUSB endpoint. WUSB devices comprise printers, hard drives, digital cameras, scanners, facsimile machines, etc. Each device is identified by a device address. An endpoint within the device is identified by an endpoint number. Associated with each address, including endpoint number, is descriptor information. Descriptor information includes maximum packet size, the polling rate for the endpoint, and other endpoint attributes. The endpoint address (device address and endpoint number) and descriptor information collectively form an RPIPE descriptor. RPIPE descriptors are stored in memory 1022 of HWA 1020.

There may be more endpoints of WUSB devices than there will be memory for RPIPE descriptors and associated data in the HWA. For example, memory 1022 of HWA 1020 may support six RPIPE descriptors, whereas there may be 10 endpoints of WUSB devices 1030, 1032 with which to communicate. At times, then, the number of transfer requests from the computer would require more memory than is available in the HWA. In a conventional approach, the host software responds by either retargeting an existing RPIPE to another endpoint, or setting an existing RPIPE to idle and configuring another RPIPE for this transfer. The retargeting and reconfiguring of RPIPES adds significant overhead (approximately 10-20%) to each transfer.

More specifically, in one conventional approach, when a transfer request is initiated, but there is not current additional memory in the HWA, special handling of the RPIPE descriptors is performed. First, the host software retrieves an RPIPE descriptor from the HWA and saves it so the RPIPE can be retargeted. Next, the host software sets the RPIPE descriptor for the new transfer. These two steps will need to be performed each time the RPIPE is retargeted. Each of these control transfers require about 125 microseconds for a total of 250 microseconds. An average transfer takes approximately 2 milliseconds. The overhead is therefore $250/2000$. In another conventional approach, three steps are required. First, the host gets an RPIPE descriptor and saves it so the RPIPE can be retargeted. Second, the host sets the RPIPE descriptor to free the memory used by this RPIPE (by setting the number of blocks used on this RPIPE to zero in the RPIPE descriptor). Third, the host sets another RPIPE descriptor and allocates the memory freed by the previous set RPIPE descriptor to this RPIPE to be used for the endpoint to which this transfer is targeted. These three control transfers require a total of 375 microseconds. The overhead is therefore $375/2000$.

In contrast, embodiments herein do not make these control transfers. Rather, RPIPE memory structures of the host software are updated to keep track of the blocks used by an RPIPE. Thus, when a WUSB transfer is initiated by the host processor, the processor executes instructions to determine if the number of blocks needed for the transfer will exceed the total number of blocks in configured RPIPES. If the number of blocks needed does not exceed the blocks available, the transfer is sent to the HWA. If the number of blocks needed does exceed the blocks available, the transfer is placed in a queue in the host computer. The processor then waits for a pending transfer to complete to free resources for another transfer. Next, the RPIPE memory structures on the host are updated to keep track of the blocks used by the RPIPE for the present transfer. The transfer is then sent to the Host Wire Adapter.

FIG. 2A shows a more detailed view of Host Wire Adapter 1020 comprising a Media Device Controller 2002, a Device Control/Status Unit 2004, and a Host Transaction Engine 2006. Media Device Controller 2002 processes communications between host computer 1010 and HWA 1020. These communications include standard USB-to-WUSB requests, and class specific requests. A controller 2002 may thus be implemented as an endpoint controller. Device Control and Status Unit 2004 provides device status and control information. The unit may be controlled using standard and class specific USB commands. Standard requests include "Get Device Descriptor," and "Set Address." Class specific requests include "Get Wire Adapter Status," and "Set/Clear Wire Adapter Feature."

Host Transaction Engine 2006 processes communications between the Host Wire Adapter and the WUSB devices by way of logical RPIPES and thus provides transaction control. Host Transaction Engine 2006 may prioritize RPIPES by type of transfer. Host Transaction Engine 2006 provides priority service to periodic RPIPES and may thus operate isochronously. Host Transaction Engine 2006 may provide round robin service to asynchronous RPIPES. Memory 1022 stores data and RPIPE attributes that include a device address and endpoint number, type of transfer, number of requests, buffer size, etc. RPIPES are logical abstractions for organizing the passage of transactions to the Host Transaction Engine. RPIPES are likewise used for returning transaction status and data to the host.

Each RPIPE can be associated with data to be transferred. Thus, when a transfer request is initiated in the host computer, the processor, operating under the directions of RPIPE management software, will determine if enough memory in the HWA is available to process the transaction. This is done without transmitting information from the HWA to the host since the host already knows the total memory in the HWA and keeps track of how much is being currently used for other transactions. If there is enough memory available, the request is sent to the HWA. More specifically, each RPIPE in the HWA has an index. A transfer request therefore comprises the index of the RPIPE in the HWA and the data to be transferred. If there is not enough memory available in the HWA for the transaction, the transfer request is placed in a queue stored in the host memory. When a current transaction is completed, the next-out transfer request is copied from the queue and sent to the HWA.

The Host Wire Adapter (HWA) comprises transmitter/receiver (transceiver) 1024 for transmitting to and receiving from a plurality of WUSB devices. FIG. 2 shows an embodiment of an integrated circuit 1002 comprising a transceiver unit 1024 as may be found in a Host Wire Adapter (HWA). Transceiver 1024 comprises a receiver 204 and a transmitter 206. An embodiment of a transmitter comprises an encoder 208, a modulator 210, an upconverter 212, and an amplification stage 214. An embodiment of a receiver comprises an amplification stage 220, a downconverter 222, a demodulator 224 and a decoder 226. Each of these components of transceiver 1024 and their functions will now be described.

Encoder 208 of transmitter 206 receives data destined for transmission from a core 202 of the HWA. Core 202 comprises Media Device Controller 2002 Device Control/Status Unit 2004 and Host Transaction Engine 2006 as well as memory 1022. Core 2002 may present data to transceiver 1024 in blocks such as bytes of data. Encoder 208 encodes the data and may introduce redundancy to the data stream. Adding redundancy increases the channel bandwidth required to transmit the information, but results in less error, and enables the signal to be transmitted at lower power. Encryption may also be performed for security.

Modulator 210 of transmitter 206 receives data from encoder 208. A purpose of modulator 210 is to transform each block of binary data received from encoder 208 into a unique continuous-time waveform that can be transmitted by an antenna upon upconversion and amplification. The modulator impresses the received data blocks onto a sinusoid of a selected frequency. The output of the modulator is a band pass signal that is upconverted to a transmission frequency, amplified, and delivered to an antenna.

The output of modulator 210 is fed to upconverter 212. A purpose of upconverter 212 is to shift the modulated waveform received from modulator 210 to a much higher frequency. Shifting the signal to a much higher frequency before transmission enables use of an antenna of practical dimensions. That is, the higher the transmission frequency, the smaller the antenna can be. The required bandwidth of the transmitted signal depends upon the method of modulation. A bandwidth of about 10% is exemplary. The encoded, modulated, upconverted, filtered signal is passed to amplifier 214. In an embodiment, amplifier 214 provides high power amplification to drive the antenna 218. However, the power does not need to be very high to be received by receivers in close proximity to transmitter 206. Thus, one may implement a transmitter of moderate or low power output capacity. The required RF transmitter power to effectuate communications within the distances between transceiver units and endpoint USB devices may be varied.

FIG. 2 also shows a diplexer 216 connected to antenna 218. Thus, in this embodiment, a single antenna is used for both transmission and reception. When transmitting, the signal from amplifier 214 passes through diplexer 216 and drives the antenna with the upconverted information-bearing signal. The diplexer prevents the signal from amplifier 214 from entering receiver 204. When receiving, an information bearing signal received by the antenna passes through diplexer 216 to deliver the signal from the antenna to receiver 204. The diplexer then prevents the received signal from entering transmitter 206. In another embodiment, separate antennas may be used for transmit and receive and a diplexer is not needed. A transmit antenna 218 radiates the information bearing signal into a time-varying, spatial distribution of electromagnetic energy that can be received by an antenna of a receiver. A receiver of a WUSB device or the HWA can then extract the information of the received signal.

FIG. 2 also shows an embodiment of a receiver 204 for receiving, demodulating, and decoding an information bearing signal. The signal is fed from antenna 218 to a low noise amplifier 220. Amplifier 220 comprises filter circuitry which passes the desired signal information and filters out noise and unwanted signals at frequencies outside the pass band of the filter circuitry. A downconverter 222 downconverts the signal at the carrier frequency to an intermediate frequency or to base band. By shifting the received signal to a lower frequency or to baseband, the function of demodulation is easier to perform. Demodulator 224 demodulates the received signal to extract the information content from the received down converted signal to produce an information signal. Decoder 226 decodes the information signal received from demodulator 224 and transmits the decoded information to core 202 of the HWA. Persons of skill in the art will recognize that a transceiver will comprise numerous additional components not shown in FIG. 2. Note that each WUSB device, including a Device Wire Adapter, has its own transceiver which operates substantially as described above.

Figure 3:
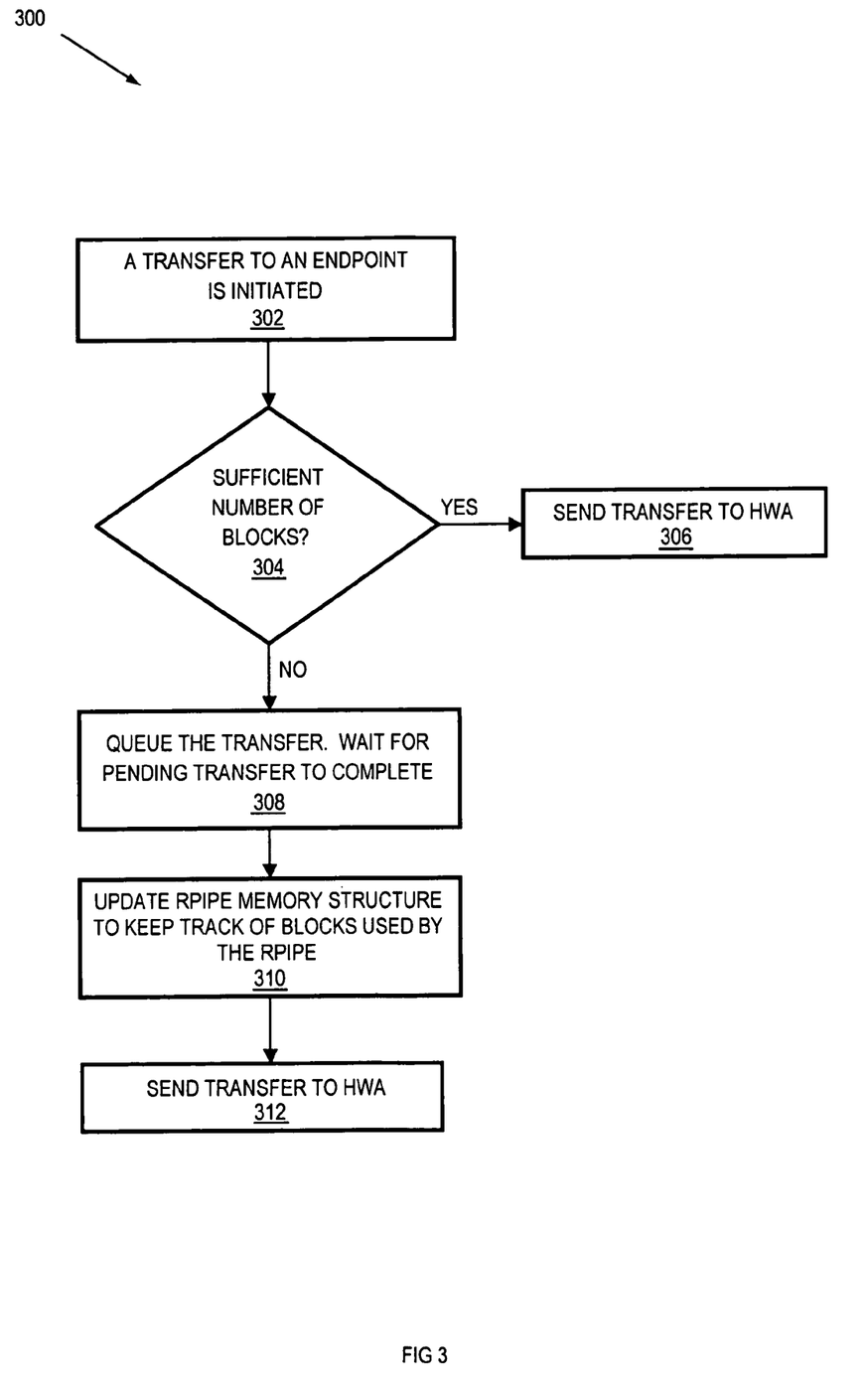
FIG. 3 depicts a flow chart of an embodiment for processing transfer requests and maintaining a queue of pending requests in a memory of processing machine.

FIG. 3 shows a flow chart 300 of an embodiment for processing transfer requests. The processor of the host computer will process transfer requests initiated during the course of operation (element 302). These requests comprise a request to transfer data to a device designated by the index of an RPIPE in HWA memory. For example, data may need to be transmitted by Wireless USB to a printer or digital camera. A request may also comprise a request to transfer data from a device to the host. Thus, data can be transferred from a digital camera, for example, to the host computer.

The transfer request is processed by the processor operating under the directions of RPIPE management code. The processor processes the transfer request by determining if there are sufficient blocks of memory in the HWA to support the request (element 304.) Recall, that the HWA has limited memory and can store only so many RPIPES, ideally about twice as many RPIPES as devices. When there is an available RPIPE, the transfer request can be sent to the HWA (element 306.) The request includes the index of the RPIPE descriptor stored in the HWA and the RPIPE information includes the address of the endpoint of the transfer.

The processor keeps track of RPIPE usage and knows therefore when there is not enough available memory in the HWA. When this occurs, the processor places the transfer request in a queue stored in the host memory (element 308). In one embodiment the queue is first-in-first-out. In another embodiment the queue is last-in-first out. The processor waits for a current transaction to end to free up available memory space. The processor updates the host memory to keep track of RPIPES in use, and consequently keeps track of the available blocks of memory in the HWA (element 310). When there is once again available memory space, the processor sends the transfer to the HWA (element 312).

Some embodiments of the invention are implemented as a program product for use with a computer system such as, for example, the system 116 shown in FIG. 1. The program product could be used on other computer systems or processors. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-accessible format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Thus, another embodiment of the invention provides a machine-accessible medium containing instructions effective, when executing by a machine, to cause the machine to perform a series of operations for management of RPIPES in a Wireless Universal Serial Bus (WUSB) environment. The operations comprise associating a transfer request with an RPIPE to transfer data between a host system and an endpoint of a WUSB device. The operations comprise determining if sufficient memory is currently available in a Host Wire Adapter (HWA) to support the requested transfer. If there is sufficient memory currently available, the machine sends the request to the HWA. If there is not sufficient memory currently available, then the machine places the transfer request in a queue pending completion of a current request.

The operations may further comprise maintaining in a memory of the machine a current availability of HWA memory. The operations may comprise maintaining in a memory of the machine an address for each of a plurality of RPIPES of the HWA. The operations may also comprise maintaining in a memory of the machine an address of each RPIPE currently in use or not in use. The operations may yet further comprise receiving from the HWA a total memory of the HWA. Each RPIPE associated with a transfer request is itself associated with a number of blocks of memory of the HWA. The queue to store pending requests may be maintained in a first-in-first-out queue or in a last-in-first-out-queue or even a random queue.

The present invention and some of its advantages have been described in detail for some embodiments. It should be understood that various changes, substitutions and alterations can be made herein without departing from the spirit and scope of the invention as defined by the appended claims. An embodiment of the invention may achieve multiple objectives, but not every embodiment falling within the scope of the attached claims will achieve every objective. Moreover, the scope of the present application is not intended to be limited to the particular embodiments of the process, machine, manufacture, composition of matter, means, methods and steps described in the specification. One of ordinary skill in the art will readily appreciate from the disclosure of the present invention that processes, machines, manufacture, compositions of matter, means, methods, or steps, presently existing or later to be developed are equivalent to, and fall within the scope of, what is claimed. Accordingly, the appended claims are intended to include within their scope such processes, machines, manufacture, compositions of matter, means, methods, or steps.

What is claimed is:

1. A method for managing, by way of a host computer, remote pipes (RPIPES) in a Wireless Universal Serial Bus (WUSB) system, comprising:
   configuring an RPIPE to target transfer requests to an endpoint of a WUSB device independently of an amount of memory available in a Host Wire Adapter (HWA);
   receiving a request associable with an RPIPE to transfer data between a host computer and an endpoint of a WUSB device; wherein a memory of the host computer stores descriptors for each of a plurality of RPIPES of the HWA;
   maintaining in a memory of the host computer an amount of memory available in the HWA;
   determining from the memory of the host computer if sufficient memory is currently available in the HWA to support the requested transfer;
   sending the request to the HWA only if there is sufficient memory currently available; and
   if there is not sufficient memory currently available, then placing the transfer request in a queue pending completion of a current request.

2. The method of claim 1, wherein the host computer stores an index of each RPIPE currently in use.

3. The method of claim 1, wherein the host computer stores an index of each RPIPE currently not in use.

4. A system for processing transfers of information wirelessly between a host computer and Wireless Universal Serial Bus (WUSB) devices, comprising:
   a processor within the host computer to process transfer requests to transfer information between the host computer and a WUSB device; the processor maintaining a memory of the host computer to store a current availability of memory in a Host Wire Adapter (HWA), and maintaining a queue of pending requests when there is insufficient available memory in the HWA to support a transfer; and
   a Host Wire Adapter (HWA) to receive transfer requests associable to an available RPIPE for transfer of information between the host computer and an endpoint of a WUSB device; wherein the HWA comprises a host transaction engine to provide control of WUSB transactions between the HWA and WUSB devices.

5. The system of claim 4, wherein the HWA comprises a media device controller to control communications between the HWA and the host computer.

6. The system of claim 5, wherein the HWA comprises a device control/status unit to provide HWA control and status information.

7. The system of claim 4, wherein the HWA comprises a device control/status unit to provide HWA control and status information.

8. A machine-accessible medium containing instructions for RPIPE management in a Wireless Universal Serial Bus (WUSB) environment, which, when the instructions are executed by a machine, cause said machine to perform operations, comprising:

configuring an RPIPE to target transfer requests to an endpoint of a WUSB device independently of an amount of memory available in a Host Wire Adapter (HWA);

maintaining in a memory of the machine, external to the HWA, an index of each RPIPE currently not in use;

associating a transfer request with an RPIPE to transfer data between a host system and an endpoint of a WUSB device;

determining from the memory of the machine external to the HWA if sufficient memory is currently available in the Host Wire Adapter (HWA) to support the requested transfer;

sending the request to the HWA only if there is sufficient memory currently available, and if there is not sufficient memory currently available, then placing the transfer request in a queue pending completion of a current request.

9. The machine accessible medium of claim 8, wherein the operations further comprise maintaining in a memory of the machine external to the HWA descriptors for each of a plurality of RPIPES in the HWA.

10. The machine accessible medium of claim 8, wherein the operations further comprise maintaining in a memory of the machine an index of each RPIPE currently in use.

11. The machine accessible medium of claim 8, wherein the operations further comprise receiving from the HWA a total memory of the HWA.

12. The machine accessible medium of claim 8, wherein an RPIPE associated with a transfer request is itself associated with a number of blocks of memory of the HWA.

13. The machine accessible medium of claim 8, wherein the queue is maintained in a memory of the machine as a first-in-first-out queue.

14. A method for managing remote pipes (RPIPES) in a Wireless Universal Serial Bus (WUSB) system, comprising:

configuring an RPIPE to target transfer requests to an endpoint of a WUSB device independently of an amount of memory available in a Host Wire Adapter (HWA);

receiving a request associable with an RPIPE to transfer data between a host computer and an endpoint of a WUSB device; wherein the host computer stores an index of each RPIPE currently in use;

determining from the memory of the host computer if sufficient memory is currently available in a HWA to support the requested transfer;

sending the request to the HWA only if there is sufficient memory currently available, and if there is not sufficient memory currently available, then placing the transfer request in a queue pending completion of a current request.

15. A system for processing transfers of information wirelessly between a host computer and Wireless Universal Serial Bus (WUSB) devices, comprising:

a processor within the host computer to process transfer requests to transfer information between the host computer and a WUSB device; the processor maintaining a memory of the host computer to store a current availability of memory in a Host Wire Adapter (HWA), and maintaining a queue of pending requests when there is insufficient available memory in the HWA to support a transfer; and a Host Wire Adapter (HWA) to receive transfer requests associable to an available RPIPE for transfer of information between the host computer and an endpoint of a WUSB device; wherein the HWA comprises a device control/status unit to provide HWA control and status information.

16. A machine-accessible medium containing instructions for RPIPE management in a Wireless Universal Serial Bus (WUSB) environment, which, when the instructions are executed by a machine, cause said machine to perform operations, comprising:

configuring an RPIPE to target transfer requests to an endpoint of a WUSB device independently of an amount of memory available in a Host Wire Adapter (HWA);

maintaining in a memory of the machine, external to the HWA, descriptors for each of a plurality of RPIPES in the HWA;

associating a transfer request with an RPIPE to transfer data between a host system and an endpoint of a WUSB device;

determining from the memory of the machine external to the HWA if sufficient memory is currently available in the HWA to support the requested transfer;

sending the request to the HWA only if there is sufficient memory currently available, and if there is not sufficient memory currently available, then placing the transfer request in a queue pending completion of a current request.

17. A machine-accessible medium containing instructions for RPIPE management in a Wireless Universal Serial Bus (WUSB) environment, which, when the instructions are executed by a machine, cause said machine to perform operations, comprising:

configuring an RPIPE to target transfer requests to an endpoint of a WUSB device independently of an amount of memory available in a Host Wire Adapter (HWA);

receiving from the HWA a total memory of the HWA;

associating a transfer request with an RPIPE to transfer data between a host system and an endpoint of a WUSB device;

maintaining in a memory of the machine, external to the HWA, an index of each RPIPE currently not in use;

determining from the memory of the machine external to the HWA if sufficient memory is currently available in the Host Wire Adapter (HWA) to support the requested transfer;

sending the request to the HWA only if there is sufficient memory currently available, and if there is not sufficient memory currently available, then placing the transfer request in a queue pending completion of a current request.

18. A machine-accessible medium containing instructions for RPIPE management in a Wireless Universal Serial Bus (WUSB) environment, which, when the instructions are executed by a machine, cause said machine to perform operations, comprising:

configuring an RPIPE to target transfer requests to an endpoint of a WUSB device independently of an amount of memory available in the Host Wire Adapter (HWA);

associating a transfer request with an RPIPE to transfer data between a host system and an endpoint of a WUSB device; wherein an RPIPE associated with a transfer request is itself associated with a number of blocks of memory of the HWA maintaining in a memory of the machine, external to the HWA, an index of each RPIPE currently not in use;

determining from the memory of the machine external to the HWA if sufficient memory is currently available in a Host Wire Adapter (HWA) to support the requested transfer;

sending the request to the HWA only if there is sufficient memory currently available, and if there is not sufficient memory currently available, then placing the transfer request in a queue pending completion of a current request.

* * * * *